(12) United States Patent
Weale

(10) Patent No.: US 8,760,004 B2
(45) Date of Patent: Jun. 24, 2014

(54) ELECTRICAL POWER DISTRIBUTION

(75) Inventor: Denis Vaughan Weale, Bristol (GB)

(73) Assignee: GE Aviation Systems Limited, Gloucestershire (GB)

(*) Notice: Subject to any disclaimer, the term of this patent is extended or adjusted under 35 U.S.C. 154(b) by 176 days.

(21) Appl. No.: 12/722,782

(22) Filed: Mar. 12, 2010

(65) Prior Publication Data
US 2010/0231042 A1 Sep. 16, 2010

(30) Foreign Application Priority Data
Mar. 16, 2009 (GB) .................... 0904487.6

(51) Int. Cl.
H02J 1/00 (2006.01)

(52) U.S. Cl.
USPC ................ 307/11; 307/19; 700/295

(58) Field of Classification Search
CPC ........................................... H02J 1/00
USPC ................ 307/29, 11, 19; 700/295
See application file for complete search history.

(56) References Cited

U.S. PATENT DOCUMENTS

| 3,911,415 | A | * | 10/1975 | Whyte | ................ 340/10.1 |
| 4,321,645 | A | | 3/1982 | Thom et al. | |
| 4,403,292 | A | | 9/1983 | Ejzak et al. | |
| 5,386,363 | A | | 1/1995 | Haak et al. | |
| 5,637,933 | A | | 6/1997 | Rawlings et al. | |
| 5,729,059 | A | * | 3/1998 | Kilroy et al. | ................ 307/84 |
| 5,844,329 | A | | 12/1998 | Bailey et al. | |
| 5,936,318 | A | | 8/1999 | Weiler et al. | |
| 6,778,414 | B2 | | 8/2004 | Chang et al. | |
| 6,856,045 | B1 | | 2/2005 | Beneditz et al. | |
| 7,388,303 | B2 | * | 6/2008 | Seiver | ................ 307/19 |
| 7,825,536 | B2 | * | 11/2010 | Jacobson et al. | ................ 307/19 |
| 8,072,093 | B2 | * | 12/2011 | Jacobson et al. | ................ 307/19 |

(Continued)

FOREIGN PATENT DOCUMENTS

| GB | 2290423 | 12/1995 |
| JP | 59086429 A | 5/1984 |

(Continued)

OTHER PUBLICATIONS

Search Report and Written Opinion from EP Application No. 10155505.0 dated Oct. 15, 2013.

(Continued)

Primary Examiner — Daniel Cavallari
(74) Attorney, Agent, or Firm — Global Patent Operation; Vivek P. Shankam

(57) ABSTRACT

The present invention relates generally to electrical power distribution, for example, in aircraft. More particularly, according to a first aspect, the present invention relates to a power supply system for power distribution to one or more loads in a safety-critical power supply network. The power supply system comprises at least one power source, a power bus and a distributed control system. The distributed control system comprises a central controller operably coupled to at least one bus module through a data bus. Bus modules include bus controllers that are operable to connect respective power sources to the power bus.

17 Claims, 4 Drawing Sheets

(56) References Cited

U.S. PATENT DOCUMENTS

| | | | |
|---|---|---|---|
| 2004/0024475 A1* | 2/2004 | Berkcan et al. | 700/22 |
| 2004/0119454 A1* | 6/2004 | Chang et al. | 323/284 |
| 2004/0158772 A1* | 8/2004 | Pan et al. | 714/14 |
| 2007/0259545 A1 | 11/2007 | Berenger | |
| 2010/0264727 A1* | 10/2010 | Riedel et al. | 307/9.1 |

FOREIGN PATENT DOCUMENTS

| | | |
|---|---|---|
| JP | 2001028848 A | 1/2001 |
| JP | 2005027459 A | 1/2005 |
| WO | 97/21265 | 6/1997 |
| WO | 02058206 A1 | 7/2002 |
| WO | 2006/087379 | 8/2006 |

OTHER PUBLICATIONS

Office Action and Search Report from CN Application No. 201010157157.7 dated Aug. 22, 2013, along with unofficial English translation.

Unofficial English translation of Japanese Office Action issued in connection with corresponding JP Application No. 2010-056860 on Feb. 25, 2014.

* cited by examiner

ELECTRICAL POWER DISTRIBUTION

CROSS-REFERENCE TO RELATED APPLICATIONS

This application claims priority under 35 U.S.C. §119(a)-(d) or (f) to prior-filed, co-pending British application number 0904487.6, filed on Mar. 16, 2009, which is hereby incorporated by reference in its entirety.

BACKGROUND OF THE INVENTION

1. Field of the Invention

The present invention relates generally to electrical power distribution. More particularly, the present invention relates to a power supply system and method for power distribution in a safety-critical power supply network, such as might be provided, for example, in certain aircraft.

2. Description of the Related Art

It is generally well-known to provide power supply networks to distribute power from various power sources to various electrical loads that consume the distributed electrical power [1-4].

However, for certain applications, reliable continuous operation of various of the electrical loads may be critical to safety. For example, in an aircraft it may be necessary to ensure that electric-powered actuators for operating wing surfaces such as ailerons, rudder, flaps, lift dumpers, driver motors for steering systems, thrust reversers, etc., can be operated reliably.

Hence it is known to provide power supply networks that have various design features such as redundancy, load management, etc., to ensure that failures of various generators, or other supply network components, will not shut down all electrical loads coupled thereto [5-12].

Nevertheless, whilst such power supply networks provide an improvement on previous conventional power supplies, there still exist various drawbacks associated with such networks. For example, these networks tend to require complex controller architecture that not only makes such systems difficult to scale up in size, particularly when electrical contactors need to be distributed around an airframe for example, but that also increases the potential for unpredictable faults to occur.

SUMMARY OF THE INVENTION

The present invention has thus been devised whilst bearing the above-mentioned drawbacks associated with conventional power supply networks techniques in mind.

According to a first aspect of the present invention, there is provided a power supply system for power distribution to one or more loads in a safety-critical power supply network. The power supply system comprises at least one power source, a power bus and a distributed control system. The distributed control system comprises a central controller operably coupled to at least one bus module through a data bus. The bus module includes a bus controller that is operable to connect a power source to the power bus.

According to a second aspect of the present invention, there is provided a bus module for use in a power supply system provided in accordance with the first aspect of the present invention. The bus module comprises a bus controller that is operable to connect a power source to a power bus associated with the bus module.

According to a third aspect of the present invention, there is provided a method for distributing power in a safety-critical power supply network. The method comprises checking instructions from a central controller in a localised bus controller, and conditional on those instructions being safe to execute, executing them. If the instructions are not determined to be safe to execute, for example, by a localised bus controller provided in a bus module in accordance with the second aspect of the present invention, then the bus controller is operated in a safe mode.

By providing a distributed control system architecture, and methods, for a power supply in accordance with various aspects of the present invention, a power supply system having high availability and reliability can be provided. Such a power supply system is particularly suited to use in safety-critical applications, such as, for example, in aerospace power distribution systems.

Additionally, various embodiments of the present invention provide a simple, modular architecture. This makes expansion of the power supply system easy, without the need to add multiple extra connecting wires and without complicating the system architecture to the point where unintended non-predictable faults (e.g. caused by instruction conflicts/timing errors/etc.) may occur.

As an added bonus, certain embodiments of the present invention can be made to be physically lighter and more compact than for conventional power supply systems, since they require less wiring; this being of particular benefit for weight and space constrained applications, such as, for example, aerospace.

BRIEF DESCRIPTION OF THE DRAWINGS

Various aspects and embodiments of the present invention will now be described in connection with the accompanying drawings, in which.

DETAILED DESCRIPTION OF THE INVENTION

Figure 1:
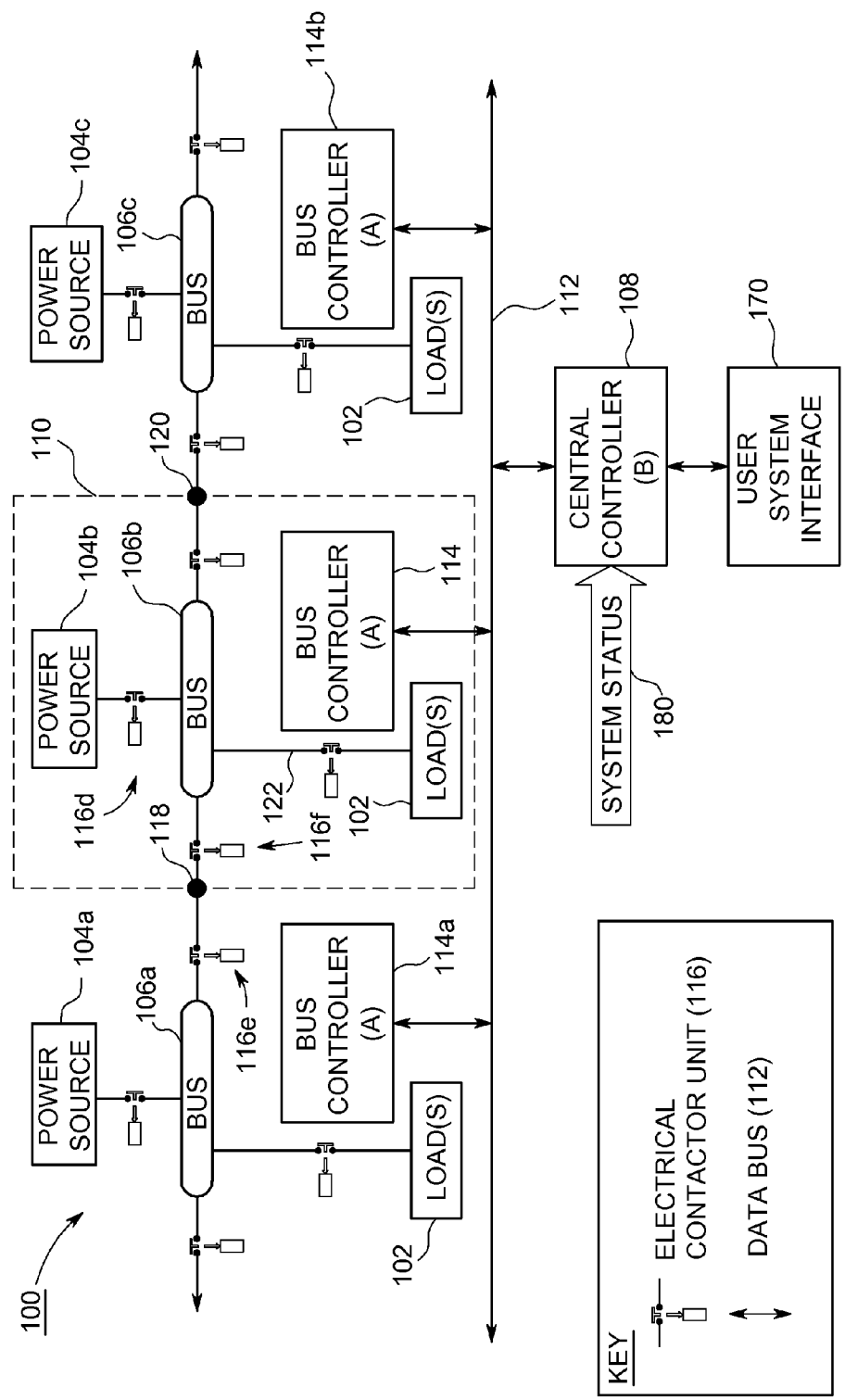
FIG. 1 shows a power supply system according to an embodiment of the present invention.

FIG. 1 shows a power supply system 100 according to an embodiment of the present invention. The power supply system 100 may be used for power distribution to one or more loads 102 in a safety-critical power supply network, such as that found, for example, in various aircraft.

The power supply system 100 comprises at least one power source 104, a power bus 106, and a distributed control system. The distributed control system comprises a central controller 108 that is operably coupled to at least one bus module 110 through a data bus 112. The bus module(s) 110 each comprise a respective bus controller 114 that is operable to connect a respective power source 104 to the power bus 106.

The power supply system 100 may be used to support a number of individually powered loads for a user system (not shown). The user system can be connected to the power supply system 100 through a user system interface 170. The user interface 170 enables the user to see the high level configuration of the bus network, such as, for example: which power sources are available, which are connected, which contactor ties are open/closed, etc.

System status inputs 180 are also provided to the central controller 108. The system status inputs 180 are signals which are provided to the controller 108 to indicate what system state a user requires, for example: power-up; allow on-ground power; connect/disconnect selected sources (over-riding the programmed logic); etc.

For various applications, the power sources 104 may include, for example, on-ground external AC or DC power supplies, in-flight AC or DC power supplies, battery power supplies, etc. The loads 102 might, for example, include those provided for use in various industrial, vehicular, or building systems in which multiple bus bars are used to isolate loads with different in-use operational characteristics; such as, for example, ancillary/non-essential loads (e.g. background illuminations and signs, consumer loads such as seat power for laptops, galley power for cooking/coffee, etc.), utility/essential loads (e.g. specific lighting for users and air management, loads needed for full operation range of an aircraft, such as, de-icing, full function flight management; secondary flight control functions, etc.), and emergency/critical loads (e.g. emergency signs, fire detection and suppression loads, loads needed to fly to a nearest airport and land, such as, primary flight control, limited instrument set, pressurisation control, fuel pumps, landing gear deploy, etc.). Such loads 102 might, for example, have differing voltage and/or frequency supply requirements.

In the embodiment shown in FIG. 1, the bus 106 is a split power bus formed from a plurality of bus sections 106a, 106b, 106c. Each of the bus sections 106a, 106b, 106c is associated with its own bus module 110 and is operably connectable to a respective power source 104a, 104b, 104c under the control of its respective bus module 110. Use of a split bus enables the provision of redundancy in the wiring harness, if necessary, as well as the use of differing voltage/frequency power sources/generators.

Preferably the power supply system 100 comprises a plurality of bus modules 110 that are connected to one another in series. This provides a linearly scaleable architecture, in which the selective operation of the individual bus modules can be used, for example, to bypass the unavailability of its local power source or de-power if a bus is faulty.

Each electrical bus section 106a, 106b, 106c has an associated bus controller 114, 114a, 114b, that is able to actuate electrical contactor units 116 that connect to the bus sections 106a, 106b, 106c. In various embodiments, the plurality of bus controllers 114, 114a, 114b are able to co-ordinate their operation with others of the bus controllers. In certain embodiments, the electrical contactor units 116 may comprise electrical relays.

For example, if there is power on bus section 106c then bus section 106b is powered also by bus controllers 114,114b co-ordinating, as well as bus controllers 114,114a co-ordinating to allow bus section 106a to be connected. The controller 108 makes a request for this state, thereby initiating the bus controllers' 114, 114a, 114b co-ordination sequence. The sequence that the bus controllers 114, 114a, 114b close the respective electrical contactor units 116 may thus not matter.

Each bus controller 114, 114a, 114b is preferably provided with various interfaces for measuring parameters associated with its own associated bus 106b, 106a, 106c and any associated feeder busses; a feeder bus being any electrical bus that can provide power to another bus via an electrical contactor. For example, various current values may be measured to provide fault protection between busses; i.e. in case a wire between the busses shorts to ground or another wire.

Bus controllers 114 also have a data bus interface to enable them to communicate with the central controller 108 over the data bus 112. The central controller 108 may be provided as an application specific integrated circuit (ASIC), designed for a particular embodiment. Each bus controller 114, 114a, 114b is operable to interpret instructions from the central controller 108, and to measure all status data from the various busses and electrical contactors. The central controller 108 provides system instructions regarding which electrical contactors 116 should be closed by each bus controller 114. These system instructions may be based on user commands and/or logic for handling a failure of a power source, contactor, bus, etc.

The central controller 108, which may be a dual or triple redundant system, provides configuration logic that determines which sources are available for connection to the power supply network, what the desired normal configurations are, and what any fault condition configurations are. The central controller 108 is thus provided with information relating to the complete power supply system 100, including details relating to all power sources 104, contactor units 116, and bus controllers 114. This information acts as the input for accessing a lookup table that can be used to provide commands to the bus controllers 114 for the configuration they should adopt.

For example, in a first normal configuration (NC1) each bus 106a, 106b, 106c is to be powered by its own respective power source 104a, 104b, 104c with no electrical tie contactors 116 are closed. However, in a first lost source configuration (LSC1) if, for example, power source 104b fails, contactor 116d is opened and the two electrical contactors 116e, 116f situated to the left (or alternatively those to the right if the central controller 108 commands) are closed thereby re-powering the bus section 106b.

Check logic (not shown) is provided in each bus controller 114, 114a, 114b and is operable to confirm if instructions from the central controller 108 are valid and electrically safe for that bus controller to execute. If so, then the bus controller 114, 114a, 114b may operate the appropriate electrical contact units 116 as instructed. However, if any error occurs (e.g. such that the requested configuration is not achieved) the bus controller 114, 114a, 114b is operable to send an error message back to the central controller 108, thereby allowing fallback configurations to be initiated using the original unmodified configuration. For example, the bus controller 114 may send digital data back to identify the failure type: e.g. contactor did not close, the bus has a failure (short circuit), etc. Depending on the failure type, the central controller 108 may then use embedded logic to decide which contactor commands to send to each bus controller 114.

By way of further example, various techniques for operating a bus controller 114, 114a, 114b in accordance with various embodiments of the present invention are described in greater detail below.

The power supply system 100 is particularly well-suited for use in safety critical power distribution applications where high availability and/or reliability is required. One preferred application is for an aerospace power distribution system.

Moreover, by using a simple modular architecture (e.g. with serial connection of bus modules 110), power supply system expansion is made easy, and can readily be physically distributed, without unnecessarily complicating the system connection architecture or potentially inducing unpredictable faults, e.g. that might be caused by instruction conflicts/timing errors/etc., that may occur when using a more complex architecture.

Figure 2:
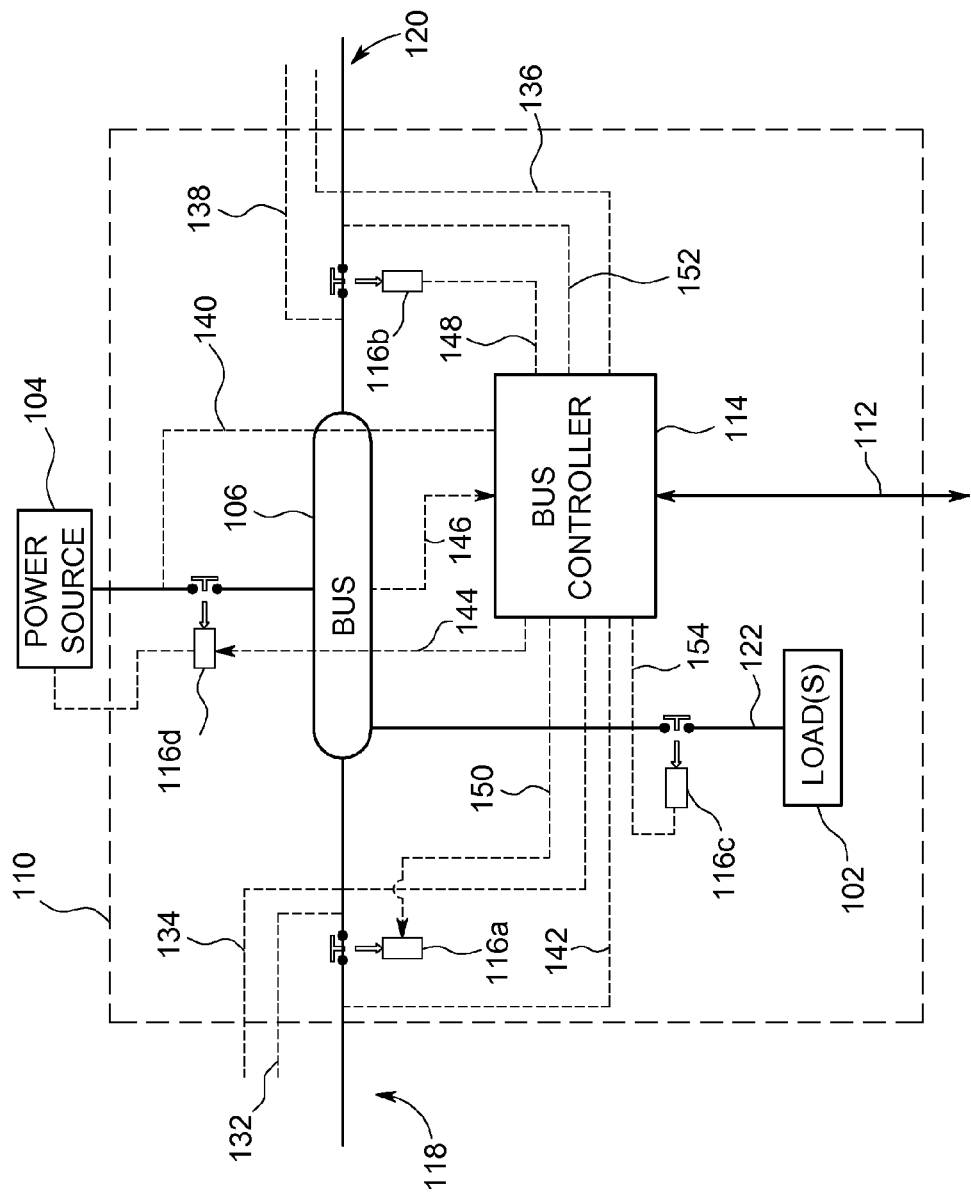
FIG. 2 shows an enlarged view of a bus module connected to various components in the power supply system of FIG. 1.

FIG. 2 shows, for further clarity, an enlarged view of a bus module 110 connected to various components in the power supply system 100 of FIG. 1.

It is to be understood that various components, for example one or more of the power source(s) 104, load(s) 102, bus(es) 106 and electrical connector unit(s) 116, etc., may be provided as external components in a physical embodiment of such a bus module 110. For example, in various embodiments of the present invention, various connectors, control lines, and logic and/or control functions provided by the bus module 110 may be provided by, for example, discrete integrated circuits or an ASIC coupled to various components that are provided externally to an IC/ASIC package.

The bus module 110 includes a bus controller 114 associated with an electrical bus 106. The bus controller 114 provides the following functionality: a) the ability to operate, in collaboration with another bus controller, or a generator control unit (GCU) for example, any contactor unit 116; b) the ability to measure adjacent bus or source voltages, as well as those of its own local bus 106; c) logic operable to determine if a command is safe to perform. In various embodiments, the logic is operable so that no dissimilar power sources are connected together, and/or if performing a no break power transfer (NBPT) such dissimilar power sources are only coupled for a limited time.

Bus controller 114 has a data bus interface for connecting to a data bus 112. The data bus interface provides a bi-directional communications channel that can link to an external central controller 108 for, inter alia, the purposes of: receiving commands indicating which contactor(s) to attempt to close; and transmitting status of the bus controller and success in operating any such contactor(s).

Check logic (not shown) is additionally provided that is operable to confirm if instructions received via the data bus 112 are safe for the bus controller 114 to execute. Optionally, dependent on the electrical system architecture, limited local reconfiguration authority may be delegated to the bus controller 114 in response to the operation of the check logic.

For example, in an aircraft, if power source 104 unexpectedly disconnects, the associated bus controller 114 could immediately connect to the bus 106 on the right hand side when in the air, without waiting for the central controller 108 to issue an instruction message. However, when the aircraft is on the ground there are more power supply permutations available, and so the bus controller 114 may instead wait for configuration instructions from the central controller 108. This may be a so-called "primed" response, i.e. where the central controller 108 instructs the bus controller 114 that it is in the air and that if power is lost it should not wait for a connection to the right hand side. Such an operation is very quick, and hence any loss of power seen by the loads 102 is short (typically <50 ms), thus enabling the design of the loads 102 to be simplified. Similarly, if communications are lost from the central controller 108, the bus controllers 114 may always perform a pre-set configuration after such a loss. Such a design thus provides a system having a very high availability of power for the loads 102.

The bus module 110 has a first bus connector 118 and a second bus connector 120 and is operable to electrically connect the first and/or second bus connectors 118, 120 to a power bus 106. The bus connectors 118, 120 may be used to connect adjacent split bus portions to one another and/or the bus 106 in various connection configurations. For example, a) bus connectors 118, 120 may be connected together bypassing the bus 106 (see FIG. 4, below, for example), b) the bus connectors 118, 120 may both be connected to the bus 106, c) bus connector 118 may be connected to bus 106 with bus connector 120 not being connected to the bus 106, and/or d) bus connector 120 may be connected to bus 106 with bus connector 118 not being connected to the bus 106.

In this embodiment, the bus controller 114 is coupled to the first bus connector 118 by a first power connector line 142 and to the second bus connector 120 by a second power connector line 152. The bus controller 114 can connect the first bus connector 118 to the second bus connector 120 through the power connector lines 142, 152 thereby bypassing the power bus 106, if necessary. This configuration enables adjacent bus modules 110 to be daisy chained in serial connection and to be operated in order to bypass/isolate one or more busses, thus permitting the overall system power bus architecture to be dynamically reconfigured.

Additionally, the bus controller 114 can connect either one, or both, of the first bus connector 118 and the second bus connector 120 to the bus 106. A voltage sensing connection 146 is also provided through which the bus controller 114 can measure if there is power provided on the bus 106. A power sense line 140 is also provided so that the bus controller 114 can determine whether power is available from the external power source 104. Contactor control line 144 is operable to activate electrical contactor 116d, in conjunction with a GCU (see FIG. 3, for example), to connect the external power source 104 to the bus 106.

Bus module 110 also includes a first signal line 134 and a second signal line 136 that connect to the bus controller 114. These signal lines 134, 136 (e.g. corresponding to lines S_1 and S_3 in FIG. 3) permit the bus controllers 114 of adjacent bus modules 110 to communicate with one another. The signal lines 134, 136 are used to provide discrete binary signal level indications from adjacent bus modules 110 indicating the state to which electrical contactors 116 should be set (e.g. binary 1=contact closed, binary 0=contact open, or vice versa).

Also provided are a first external voltage sensing connection 132 and a second external voltage sensing connection 138 which enable external bus modules 110 to connect to the power bus 106 in order to determine whether or not it is active, and if so what type of supply is being provided. For example, the voltage sensing connections 132, 138 may be used by an external bus module 110 to determine whether an adjacent bus module 110 is controlling an active supply 104, whether the supply 104 is an AC or DC source, the operating voltage level thereof, the frequency if an AC supply, etc.

The signal lines 134, 136 and the voltage sensing connections 132, 138 together provide independently operable interfaces that allow individual bus modules 110 to interact safely, independently of the central controller 108.

Four contactor control lines 144, 148, 150, 154 are also provided by the bus module 110. The contactor control lines 144, 148, 150, 154 are operable to provide actuation (and inactivation) signals to various externally provided electrical contactor units 116a, 116b, 116c, 116d.

Signalling on the contactor control line 150 is used to open and close an electrical contact in a first electrical contactor unit 116a in order to connect/disconnect the electrical bus 106 to/from the first bus connector 118. Signalling on the contactor control line 148 is used to open and close an electrical contact in a second electrical contactor unit 116b in order to connect/disconnect the electrical bus 106 to/from the second bus connector 120.

Signalling on the contactor control line 154 is used to open and close an electrical contact in a third electrical contactor unit 116c in order to connect/disconnect the electrical power bus 106 to/from a load connector 122 coupled in turn to one or more electrical loads 102. In various embodiments, the loads 102 might be priority designated indicating their relative importance with respect to other loads 102 provided in a system including the bus module 110.

Signalling on the contactor control line 144 is used to open and close an electrical contact in a fourth electrical contactor unit 116d in order to directly connect/disconnect the electrical bus 106 to/from the power source 104.

In various embodiments, adjacent bus modules 110 are configured to activate the electrical contactor units 116 if they agree on this as a course of action. For example, bus controller 114 may check that its proposal to open or close a contact in a particular contactor unit 116 is in agreement with an adjacent bus module 110 in accordance with the various signals that are asserted by the adjacent bus module 110 on respective of the signal lines 134, 136.

Optionally, the bus module 110 may be provided with driver circuitry for driving certain types of external contactor units 116. For example, the bus module 110 may include solid state drivers for powering relay contacts provided in external contactor units 116. The central controller 108 may be provided as a conventional embedded micro-controller with RAM, ROM, and data bus interfaces, for example, as part of an integrated modular avionic (IMA) hosted function.

By providing a bus module 110 with at least one external connector (e.g. signal lines 134, 136 and voltage sensing connections 132, 138) for connecting to an adjacent bus module, two or more bus modules 110 can be connected in series. This enables easy connection with minimal additional wiring as the bus modules can be "daisy chained" together rather than connected in a star configuration as is necessary for a centralised command architecture. Hence a simple scaleable architecture is provided that minimises architectural complexity and reduces the chance of unpredictable faults occurring, e.g. due to transmission latency, data instruction timing conflicts, etc. that can otherwise arise where physically dispersed multiple controllers are used, e.g. in an aircraft fuselage.

Figure 3:
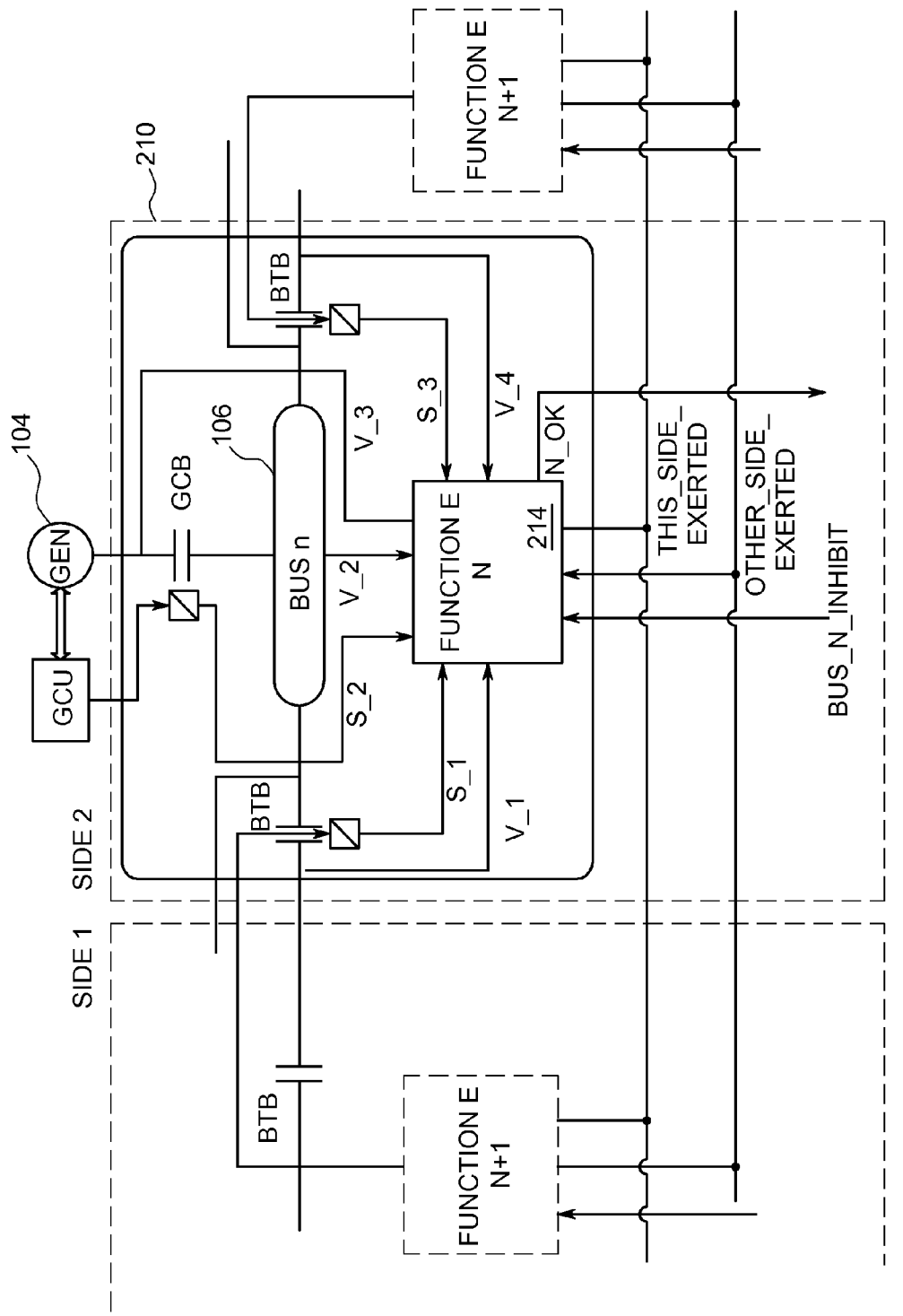
FIG. 3 shows schematically a logic diagram for implementing the functionality of the bus module of FIG. 2 according to various embodiments of the present invention.

FIG. 3 shows schematically a logic diagram 210 for implementing the functionality of the bus module 110 of FIG. 2.

The logic function of the bus controller 114 is known as "Function E" and is described in further detail below. Function E may in turn be provided by Boolean logic circuitry, which in various embodiments can be configured to operate the bus module 110 in a safe mode.

For example, a single generic type Boolean logic machine 214 may be used to manage a large number of bus bars with a high level of safety by providing independent bus level controllers. This is advantageous as autonomous individual bus modules 110 are then able to ignore instructions from a central controller 108 if, for example, they cannot be safely executed, if there are conflicts or corrupt instructions, etc. In various embodiments, bus modules 110 can default to a fail safe mode, and these can subsequently operate in isolation if need be by the provision of localised intelligence/autonomous functioning.

An associated benefit of the herein-described approach is that once the bus controllers 114 are instructed to configure, they may all perform their commands autonomously and as quickly as they are able. This ensures that as soon as safe logic conditions are met locally, the bus controllers 114 can configure appropriate contactors 116. Hence, any delays that may be associated with the need to operate multiple contactors from a conventional centrally managed system can be reduced.

Function E

Function E can operate autonomously if it is provided with a preferred connection path, which may be sent via a central controller 108. The preferred connection path may be defined using the following control signals:
1. other_side_exerted
2. this_side_exerted Alternatively, individual bus controller 114 contactor states may be specified from the central controller 108. Various embodiments of the present invention provide a designer's choice as to how certain logic functions are split between a central controller 108 and a bus controller 114.

Function E provides generic functionality that controls the connection of power sources to any bus bar (or virtual bus bar). This strategy is adopted to allow a highly modular design approach for the bus manager function and to make it simple to test blocks (simulation, software, firmware and/or hardware) that are assembled to suit any particular bus network.

Function E as illustrated in FIG. 3 shows the boundaries of the modular functions and the primary interfaces (labelled by the signal designations in Table 1, below) that are associated with it. Note that, except where the integrity of the function may require two separate units to agree for a function to operate, such as a bus-tie for example, the logic functions are entirely separate and generally do not depend on each other for information, the only exception being the source side signal lines. This independent check and agree design methodology provides a very high integrity function.

Where Function E controls the prioritised connection of available sources 104, an example of source priorities may be:
1. Own (associated) Generator 104
2. Right tie source 120
3. Left tie source 118

Function E is able to sense all points necessary to determine source availability for connection, operate electrical contactor units, detect failures, message to other functions, indicate own power available and sense if other side power is available. This last function is provided to enable control in accordance the priorities, for example, in order to enable selection of the most direct connection path to a source in the first instance. However, if this connection path fails, it does not preclude an alternative being used, although it does prevent unnecessary power breaks on busses.

The various control and switching signals employed by Function E, and as shown in FIG. 3, are now defined and described further below in following Table 1.

TABLE 1

Signal Definitions

| Signal name | Definition | Notes |
|---|---|---|
| V_1 | Other side - Left source available | This is a sense line that detects if power available. If there are 2 contactors in series this sense point may be the other side of the second contactor or even sense point at each contactor input |
| V_2 | Own bus (N) live | This is a BITE signal to the system controller to indicate bus and controller OK. |
| V_3 | Generator source available | This is the voltage sense or generator control unit (GCU) signal line indicating good power from own generator |
| V_4 | Right source available - Own side | See V_1 definition |
| S_1 | Left Bus Tie contactor low side switch | This is a low, or high, side switch capable of working in coordination with another Function E (N − 1) to close a Bus Tie contactor. |

TABLE 1-continued

Signal Definitions

| Signal name | Definition | Notes |
|---|---|---|
| S_2 | GCB lowside switch | This is a low, or high, side switch capable of working in coordination with GCU to close a GCB |
| S_3 | Right Bus Tie contactor low side switch | This is a low, or high, side switch capable of working in coordination with another Function E (N + 1) to close a Bus Tie contactor. |
| N_OK | Function E (N) functional | If Function E fails to operate, either by the contactor not functioning or contactor drive not operating then this signal will go low |
| bus_N_inhibit | Input to inhibit bus N from connecting to source | This is a mode signal that prevents a bus connecting even if suitable sources are available. This is used where there are mode specific configurations that override Function E logic |
| this_side_exerted | Indicates own side has power | This is a line that any appropriate Function E can pull low to indicate a particular priority sequence (OR Gated). |
| other_side_exerted | Indicates other side has power | This is a line that any appropriate Function E can pull low to indicate a particular priority sequence (OR Gated). |

NOTE:
N_OK, bus_N_inhibit, this_side_exerted and other_side_exerted are typical of signals that may be discrete signals or integrated into the communications bus 112 dependant on the particular implementation architecture.

The purpose of the "this_side_exerted" and "this_side_exerted" signals is to ensure the best connection route is used in electrical networks where there is a ring connection and more than one generator per side, since otherwise in such networks it is possible that a bus Function E may not connect via the best available route.

The provision of Function E in various embodiments of the invention thus enables the provision of an electrical bus management controller that can configure precisely, safely, and efficiently which sources are powering each specific bus bar type according to available power and connected load requirements. For example, such controllers may be provided in a bus module 110 for use in an aircraft having multiple power sources: e.g. main generators, auxiliary generators, and external power sources which may be AC and/or DC for supporting respective load types on the aircraft. Such an arrangement may thus provide one electrical distribution bus per power source as well as subsidiary busses in order to support various modes of operation.

In one embodiment, busses and sub-busses are connected by relays or electrical contactors, and the states that the contactors are set to is defined logically in dependence upon one or more of the following conditions: a) The power sources available and related 'Aircraft' mode of operation, such as, for example, on-ground cabin and cargo servicing with external power source(s) available, on-ground operations with no external power source(s) available, on-ground maintenance with battery power only, on-ground, in air normal operation with all normal sources available, in-air with (any) one main source lost, in-air with (any) two main sources lost, in-air with (any) three main sources lost, in-air with (any) four main sources lost, in-air with all AC sources lost, in-air; etc.; b) Any distribution overload condition containment; and c) Any one or more contactor failures.

Figure 4:
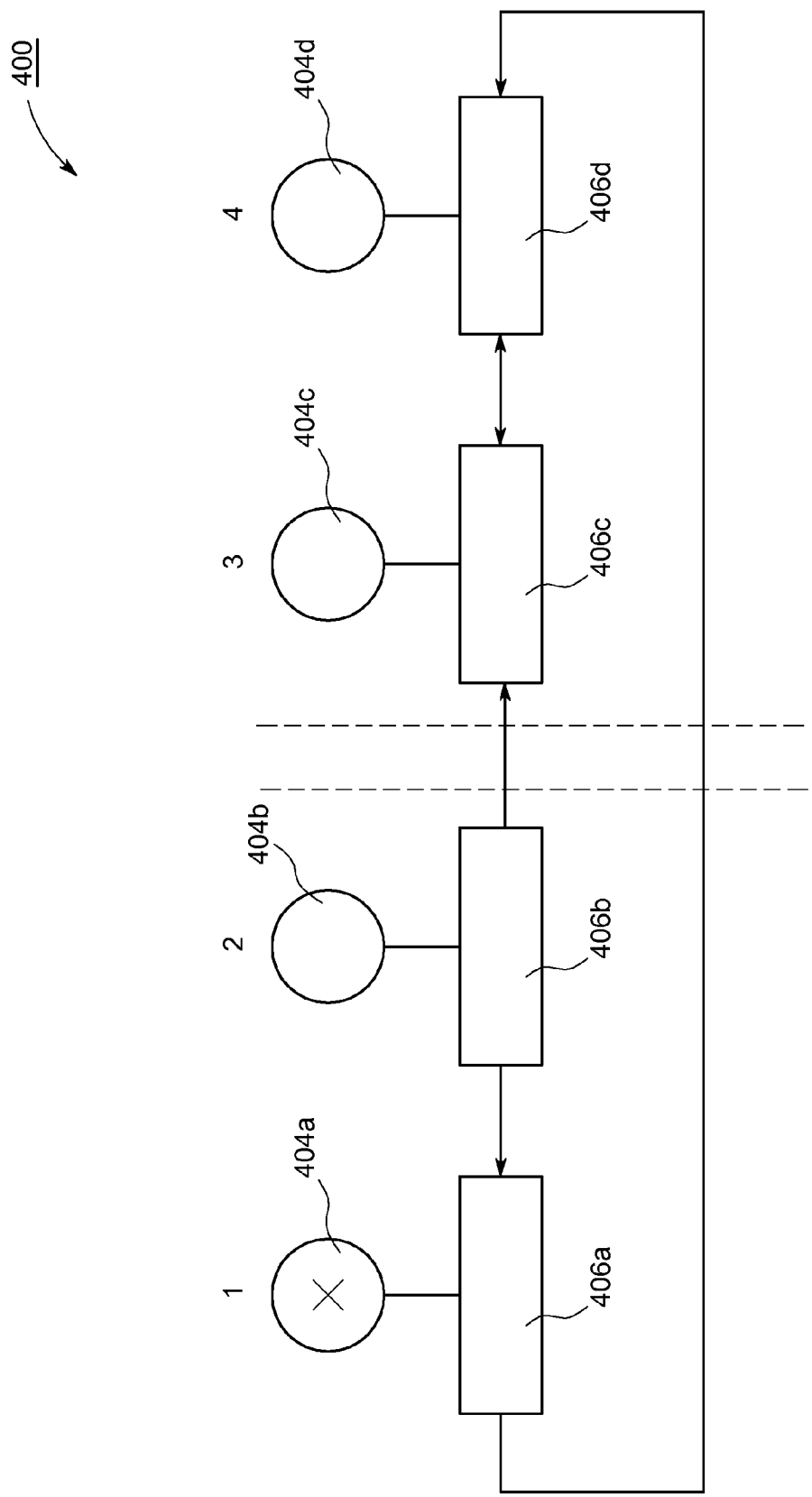
FIG. 4 illustrates a four bus power supply system in accordance with an embodiment of the present invention.

FIG. 4 illustrates a four bus power supply system 400 in accordance with an embodiment of the present invention. The power supply system 400 includes busses 406a, 406b, 406c, 406d connected serially in a ring configuration by respective bus modules (not shown). The bus modules include logic circuitry for implementing Function E, for example, as per that described above in connection with FIG. 3.

Consider FIG. 4, which illustrates a connection conundrum in which the second generator 404b only is powered, and all main busses 406a, 406b, 406c, 406d try to connect to it. In this case, there are three potential issues with this condition:
1. Logic priority may cause the connection not to be through the required route;
2. Latency may cause unnecessary break transfers as the highest priority connection is made; and
3. Contactors may oscillate between open and closed due to timing races caused by the action of independent bus controllers 114.

For example: Bus 406b powers up and busses 406a and 406c see what power is available. Busses 406a and 406c then connect through their bus tie contactors. Bus 406d then sees power from 406a or 406c, dependant on the race condition performances. If we assume it connects to 406a then 406c it will then see 406d as a preferred source (as it is on its own side and will now open the tie between 406b and 406c).

From this logical argument it can be shown that each bus should know if it needs to amend its preferred priority list according to whether a power source is in its own panel or another panel.

Hence, the Function E priority specification (as defined for a specific case of bus n that is equivalent to the third generator in a four generator architecture), may be logically coded, as follows:

```
IF NOT bus_n_inhibit THEN
CASE {
1.      IF V_1 AND this_side_exerted THEN priority
            1.      S_2
            2.      S_3
            3.      S_1
2.      IF V_1 AND other_side_exerted THEN priority:
            1.      S_2
            2.      S_1
            3.      S_3
        }
ELSE
        NOT (S_1 AND S_2 AND S_3)
END;
IF S_2 AND V_2 THEN this_side_exerted
IF (S_1 OR S_2 OR S_3) AND NOT V_2 THEN NOT n_OK
```

Those skilled in the art will be aware that many various embodiments of the present invention can be provided. For example, various embodiments of the present invention may be provided with encoded functionality to implement power supply systems, bus modules, bus controllers, control methods and the like. Such functionality may, for example, be provided using one or more software, hardware and firmware elements.

Whilst conventionally a distribution system for electrical busses is typically contained in boxes, new architectures are less centralized and the boxes are becoming more numerous and physically distributed making control more difficult. For example, electrical bus control has traditionally been done in several ways, for example: 1) With the electrical power source controllers working together, with up to 6 units, to manage the connection of the electrical busses, using cross links to maintain coordination and correct logical operation; and 2) use of one or two, systematically centrally placed, units with connections to all distribution units (e.g. in a star-like wiring configuration). In contrast, however, various embodiments of the present invention provide distributed functionality that can be performed locally whilst simplifying the logical controller unit as much as possible.

Various aspects and embodiments of the present invention are able to provide one or more of the following advantages over conventional approaches: a) providing independent command and protection circuitry between the central controller and the bus controllers and minimising the probability of hazardous erroneous operation; b) enabling high speed reconfiguration at a local level through use of independent local controllers; c) allowing for provision of a digital central controller or supervisor to provide consistent and deterministic logical configuration of all electrical busses; d) providing a modular and extensible system to readily handle different numbers of electrical busses and network configurations; e) minimising electrical control and monitoring connections (e.g. wires or printed circuit tracks) for distributed electrical bus systems; and f) supporting non-paralleled source operation and paralleled source with logic changes in the bus controller logic.

For example, one aspect of the present invention provides a method for distributing power in a safety-critical power supply network. The method comprises checking instructions from a central controller in a localised bus controller and conditional on those instructions being safe to execute, executing them, else operating the bus controller in a safe mode. Optionally error codes may be sent back to the central controller. Also, optionally, the central controller may be periodically polled for any new instructions, optionally in collaboration by multiple localised bus controllers, to determine if any conflicting instructions are issued and/or to test whether or not the bus controllers can communicate with one another and/or the central controller.

What is claimed is:

1. A power supply system for power distribution to one or more loads in a safety-critical power supply network, the power supply system comprising:
   at least one power source;
   a power bus; and
   a distributed control system,
   wherein the distributed control system comprises a central controller coupled to at least one bus module through a data bus, said bus module comprising a respective bus controller that connects a respective power source to the power bus,
   wherein the bus module has a first bus connector and a second bus connector and electrically connects the first and second bus connectors to the power bus, and
   wherein the bus module bypasses the power bus and electrically connect the first bus connector to the second bus connector.

2. The power supply system of claim 1, wherein the power bus is a split bus comprising a plurality of bus sections and each section of the split bus is connectable to a respective power source under the control of a respective bus module.

3. The power supply system of claim 1, wherein the bus module has at least one load connector and electrically connects the at least one load connector to the power bus.

4. The power supply system of claim 1, wherein the bus module has at least one external connector for connecting to an adjacent bus module.

5. The power supply system of claim 1, wherein the bus module has driver circuitry for driving external contactor units.

6. The power supply system of claim 1, wherein the at least one bus module operates in a safe mode.

7. The power supply system of claim 1, comprising a plurality of bus modules.

8. The power supply system of claim 7, wherein the plurality of bus modules are connected to one another in series.

9. A bus module for use in the power supply system of claim 1, the bus module comprising a bus controller that connects a power source to a power bus associated with the bus module.

10. The bus module of claim 9, further comprising a first bus connector and a second bus connector, wherein the bus controller electrically connects the first and second bus connectors to a power bus.

11. The bus module of claim 10, the bus controller bypasses the power bus and electrically connect the first bus connector to the second bus connector.

12. The bus module of claim 9, comprising Boolean logic circuitry that operates the bus module in a safe mode.

13. A bus module control system for a safety-critical power supply network, the bus module comprising:
   a power bus;
   a bus controller connected to the power bus through a voltage sensing line;
   a first contactor connected to the bus controller through a first contactor control line and having an open and closed position, the power bus being connected to a first bus connector in the closed position and the power bus being disconnected from the first bus connector in the open position;
   a first power connector line connecting the bus controller to the first bus connector; and
   a second power connector line connecting the bus controller to the second bus connector,
   wherein the bus controller further comprises a processor communicative with a memory, the memory having computer executable instructions recorded thereon that when read by the processor cause the bus controller to connect the first bus connector to the second bus connector by connecting the first power connector line to the second power connector line, thereby bypassing the power bus.

14. The bus module control system of claim 13, wherein instructions further cause the bus controller to (a) execute the instructions, or (b) send an error message back to the central controller.

15. The bus module control system of claim 13, wherein instructions further cause the bus controller to reconfigure connectivity of the bus module to another bus module using a primed response.

16. The bus module control system of claim 15, wherein primed response comprises authorization from the central controller to reconfigure the connectivity of the bus module.

17. The bus module control system of claim 13, wherein the bus controller measures the voltage of the bus module and at least the voltage of an adjacent, disconnected bus module.

* * * * *